US006799904B2

(12) United States Patent
Schaefer et al.

(10) Patent No.: US 6,799,904 B2
(45) Date of Patent: Oct. 5, 2004

(54) CAMERA ARRANGEMENT FOR MOTOR VEHICLES

(75) Inventors: Heiko Schaefer, Erwitte (DE); Jens Hunecke, Bad Sassendorf (DE)

(73) Assignee: Hella KG Hueck & Co., Lippstadt (DE)

(*) Notice: Subject to any disclaimer, the term of this patent is extended or adjusted under 35 U.S.C. 154(b) by 0 days.

(21) Appl. No.: 10/642,326

(22) Filed: Aug. 18, 2003

(65) Prior Publication Data

US 2004/0032668 A1 Feb. 19, 2004

(30) Foreign Application Priority Data

Aug. 16, 2002 (DE) .......................................... 102 37 608

(51) Int. Cl.$^7$ ............................................... G03B 17/02
(52) U.S. Cl. ....................... 396/427; 396/429; 359/507; 359/513; 348/148
(58) Field of Search ................................ 396/419, 427, 396/429; 359/507, 511, 513; 348/113, 143, 148

(56) References Cited

U.S. PATENT DOCUMENTS 6,170,955 B1 * 1/2001 Campbell et al. ............ 359/509
6,672,745 B1 * 1/2004 Bauer et al. ................. 348/148

FOREIGN PATENT DOCUMENTS

DE           40 16 570 A1      9/1991

* cited by examiner

*Primary Examiner*—David M. Gray
(74) *Attorney, Agent, or Firm*—Birch, Stewart, Kolasch & Birch, LLP

(57) ABSTRACT

A camera arrangement for motor vehicles with a camera that is arranged in a vehicle interior behind a window is described. In this arrangement, a transparent additional window is arranged behind and a distance away from the window, at least in the portion of the window viewed by the camera, so that a layer of air is enclosed between the window and the additional window.

19 Claims, 2 Drawing Sheets

CAMERA ARRANGEMENT FOR MOTOR VEHICLES

This nonprovisional application claims priority under 35 U.S.C. § 119(a) on German Patent Application No. 102 37 608.5 filed in Germany on Aug. 16, 2002, which is herein incorporated by reference.

BACKGROUND OF THE INVENTION

1. Field of the Invention

The present invention relates to a camera arrangement for motor vehicles, with a camera that is arranged behind a window (windshield).

2. Description of the Background Art

A camera arrangement is taught in DE 40 16 570 A1, for example. However, a problem in camera arrangements of this nature is fogging on the inside surface of the window, which is caused by condensation of water vapor on the relatively cold glass in the vehicle interior, especially in winter. A fogged interior window surface seriously impairs image acquisition by the camera, or even makes it impossible.

SUMMARY OF THE INVENTION

It is therefore an object of the present invention to provide a camera arrangement such that fogging on the interior surface of the window is prevented in the camera's field of view.

The idea upon which the invention is based to attain this object is in arranging a transparent additional window behind and a distance away from the windshield, at least in the portion of the windshield viewed by the camera, so that a layer of air is enclosed between the window and the additional window. This layer of air functions as a thermally insulating layer, achieving the result that the temperature of the additional window never differs very strongly from the temperature of the vehicle interior, even when the windshield is very cold. In other words, the temperature of the enclosed layer of air remains substantially the same as the ambient temperature of the vehicle interior. Consequently, condensation from water vapor on the additional window is avoided, since the window does not represent a "cold trap" in the vehicle interior. In addition, the volume of air enclosed between the windshield and the additional window is so small that the absolute quantity of water vapor present in this volume is not enough to form fogging that would impair the camera's view.

Tests in an environmental chamber demonstrated that the fog-inhibiting effect occurs reliably when the distance between the windshield and additional window is less than 3 mm. In particular, the fog-inhibiting effect is especially good at a distance between 1 mm and 2 mm, because a sufficiently thick layer of air is present for thermal insulation on the one hand, and on the other hand the enclosed volume of air and the absolute quantity of moisture thus enclosed is sufficiently small.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
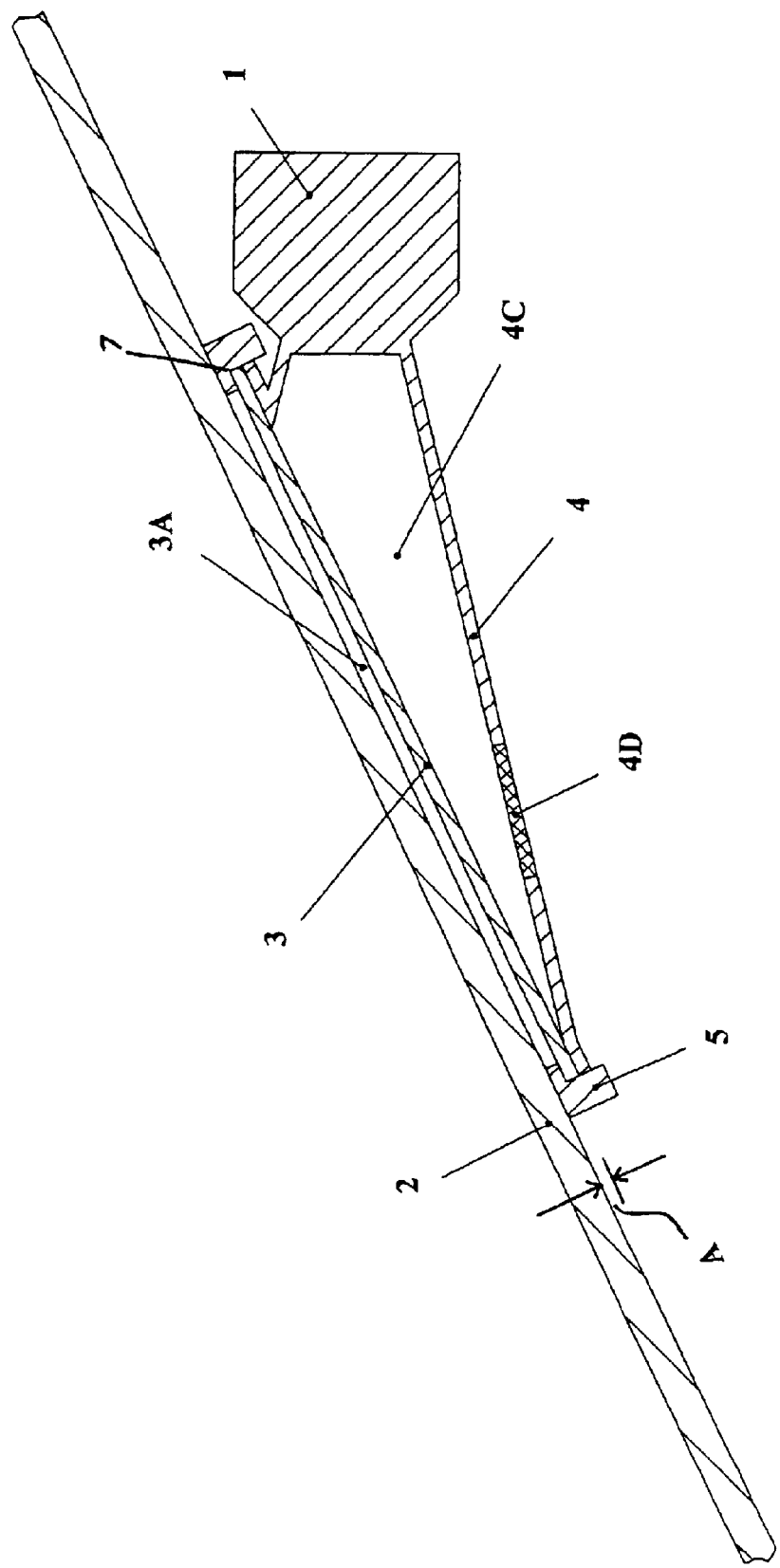
FIG. 1 is a cross-section of a camera arrangement according to a preferred embodiment of the invention.

The camera arrangement according to the invention is shown in FIG. 1. The camera arrangement includes a transparent additional window 3, which preferably is made of plastic, and is arranged a distance A in front of a windshield 2 so that a layer of air 3A is enclosed between the windshield 2 and the additional window 3. The additional window 3 extends at least across the area of the windshield 2 that is viewed by a camera 1. In other words, the additional window 3 may have a greater area than the camera viewing area that is incident on the windshield 2.

The use of plastic (instead of glass) for the additional window 3 has, in addition to manufacturing considerations, the advantage that the thermal conductivity of plastic is significantly less than that of glass, so that the thermal insulation by the additional window 3 itself is added to the very good thermal insulation by the layer of air.

In order to fasten the additional window 3 to the windshield 2 at a distance therefrom, a mounting ring 5 is preferably provided on which the additional window 3 rests. Naturally, it is not necessary for the mounting ring 5 to be a circular ring. A rectangle, trapezoid or any other kind of shape is equally possible. The mounting ring 5 itself is preferably glued to the inner surface of the windshield 2. To accommodate the additional window 3 in a fixed position, the inside of the mounting ring 5 has a step 7, which forms a support shoulder for the additional window 3. The position of the additional window 3 is laterally fixed by the inner wall of the mounting ring 5 in the area of the step 7.

Figure 3:
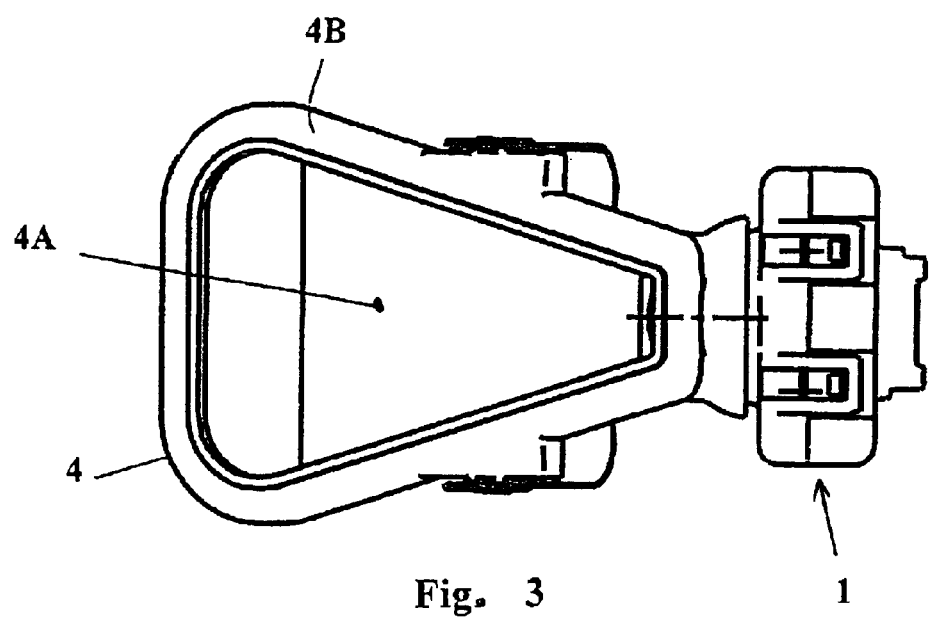
FIG. 3 is a top view of the optical window of the cover.
Figure 2:
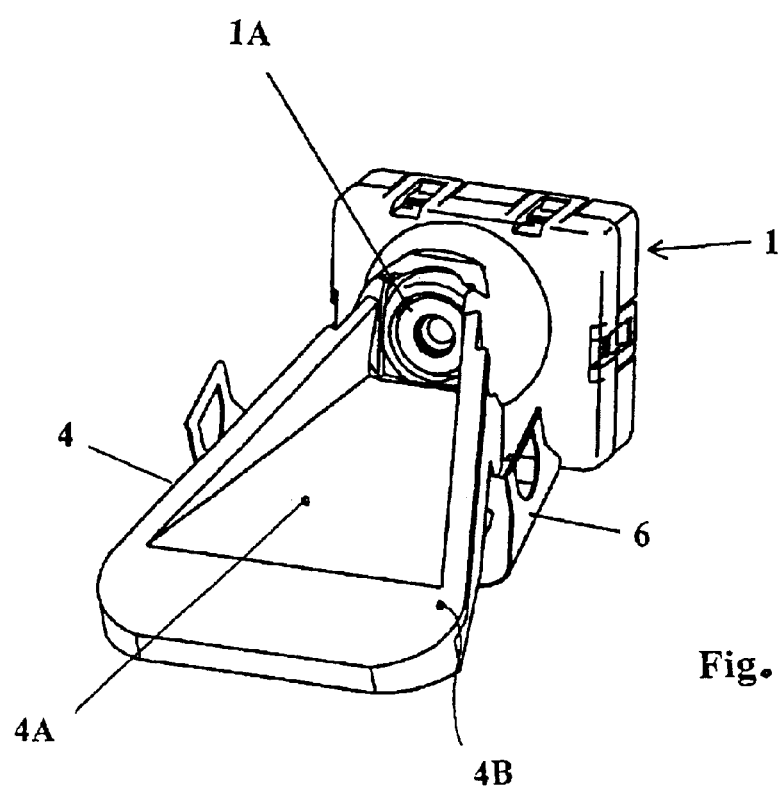
FIG. 2 is a perspective view of a cover upon which is arranged a camera that is attached behind an additional window in accordance with a preferred embodiment of the invention.

In order to avoid the entry of undesired light (for example, light from the vehicle interior reflected from the additional window) into the camera objective lens 1A, it is advantageous to provide a light-tight cover 4 that can be funnel-shaped and that surrounds the space between the windshield 2 and the camera objective lens 1A in a light-tight manner with the exception of a light-admitting opening 4A facing the windshield, as shown in FIGS. 2 and 3. The camera 1, specifically the camera objective lens 1A, is arranged in an end of the light-tight cover 4 facing away from the windshield 2. The additional window 3 in accordance with the invention is arranged in front of the light-admitting opening 4A of the light-tight cover 4 and seals it such that a second volume of air 4C is enclosed in the light-tight cover 4 behind the additional window 3. In this way, the light-tight cover 4 is preferably also sealed in a dust-tight manner, avoiding undesirable dust deposits on the camera objective 1A and the additional window 3. Here, an edge 4B surrounding the light-admitting opening 4A of the cover 4 rests against the additional window 3. Since the air volume 4C in the funnel-shaped cover 4 is relatively large, the latter preferably has a membrane 4D that is permeable to water vapor to reliably prevent the exit of moisture and thus the fogging of the additional window 3 even under the most adverse conditions. The light-tight cover 4, which tapers away from the windshield 2, also defines the field of view of the camera 1, e.g. the viewing angle of the camera.

In one embodiment, the additional window 3 is permanently attached to the mounting ring 5. This can be accomplished, for example, by gluing the additional window 3 to the mounting ring 5, or by ultrasonic or laser-beam welding of the two plastic parts, or by manufacturing the two parts from plastic as a single piece by injection molding, where the mounting ring 5 is preferably made of a non-transparent plastic material and the additional window 3 is made of a transparent plastic material. In this embodiment, the light-tight cover 4 is either glued to the additional window 3 or is pressed against the additional window 3 by a spring 6 provided between the mounting ring 5 and the light-tight cover 4.

In another embodiment, the light-tight cover 4 including the additional window 3 is manufactured from plastic as a single piece in a two-component injection molding process, in which the light-tight cover 4 is produced from a non-transparent plastic material, and the additional window 3 is produced from a transparent plastic material. In this embodiment, the additional window 3 that is designed as one piece with the light-tight cover 4 is either glued to the mounting ring 5 or can be pressed against the mounting ring 5 by the spring 6, which is between the mounting ring 5 and the light-tight cover 4.

In another embodiment, the light-tight cover 4 including the additional window 3 and the mounting ring 5 is produced from plastic as a single piece by a two-component injection molding process in which the light-tight cover 4 is produced from a non-transparent plastic material, while the additional window 3 is produced from a transparent plastic material. The mounting ring 5 here is likewise preferably produced from a non-transparent plastic material. Furthermore, the mounting ring 5, the additional window 3, and the light-tight cover 4, which are produced as a single piece, can be glued to the windshield 2.

In a further embodiment, the additional window 3 is placed loosely in the mounting ring 5 and is held there by pressure from the light-tight cover 4, which is produced by the spring 6 that is provided between the mounting ring 5 and the light-tight cover 4.

Where the foregoing discussion mentions transparent, this means either transmissive for light in the visible spectrum and/or transmissive for infrared light. The latter is especially relevant to camera arrangements for night-vision devices in motor vehicles, for example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A camera arrangement for motor vehicles having a camera that is arranged in the vehicle interior behind a window,
   wherein an additional window, which is transparent, is arranged behind and a distance away from the window, at least in the portion of the window viewed by the camera, so that a layer of air is enclosed between the window and the additional window, and
   wherein a mounting ring is arranged on the window upon which the additional window is provided at a distance from the window.

2. The camera arrangement according to claim 1, wherein the distance between the window and the additional window is less than 3 mm.

3. The camera arrangement according to claim 1, wherein the additional window is made of a transparent plastic material.

4. The camera arrangement according to claim 1, wherein a light-tight cover is provided, which surrounds the space between the window and the camera objective lens in a light-tight manner, the light-tight cover having a light-admitting opening on the side facing the window, the camera objective lens being arranged on the end of the cover facing away from the window, and the additional window being arranged in front of the light-admitting opening of the cover.

5. The camera arrangement according to claim 1, wherein the light-tight cover is designed in the shape of a funnel that tapers away from the window.

6. The camera arrangement according to claim 1, wherein the additional window is glued to the mounting ring.

7. The camera arrangement according to claim 1, wherein the additional window and the mounting ring are made of plastic, and wherein the additional window and the mounting ring are bonded together by ultrasonic or laser-beam welding.

8. The camera arrangement according to claim 1, wherein the additional window and the mounting ring are made from plastic as a single piece by injection molding.

9. The camera arrangement according to claim 8, wherein the additional window and the mounting ring are manufactured from plastic as a single piece in a two-component injection molding process, and wherein the mounting ring is produced from a non-transparent plastic material and the additional window is produced from a transparent plastic material.

10. The camera arrangement according to claim 4, wherein the light-tight cover is glued to the additional window.

11. The camera arrangement according to claim 4, wherein the light-tight cover is pressed against the additional window by a spring provided between the mounting ring and the cover.

12. The camera arrangement according to claim 4, wherein the light-tight cover and the additional window is manufactured from plastic as a single piece in a two-component injection molding process, and wherein the light-tight cover is produced from a non-transparent plastic material and the additional window is produced from a transparent plastic material.

13. The camera arrangement according to claim 12, wherein the additional window and the light-tight cover, which is formed as one piece, is glued to the mounting ring.

14. The camera arrangement according to claim 12, wherein the additional window and the light-tight cover, which is formed as one piece, is pressed against the mounting ring by a spring provided between the mounting ring and the cover.

15. The camera arrangement according to claim 4, wherein the light-tight cover, the additional window, and the mounting ring are produced from plastic as a single piece by a two-component injection molding process, and wherein the light-tight cover is produced from a non-transparent plastic material and the additional window is produced from a transparent plastic material.

16. The camera arrangement according to claim 15, wherein the mounting ring is produced from a non-transparent plastic material.

17. The camera arrangement according to claim 15, wherein the mounting ring and the additional window, which is formed as a single piece, is glued to the window.

18. The camera arrangement according to claim 4, wherein the light-tight cover has a water vapor-permeable membrane.

19. A camera arrangement comprising:
- a mounting ring arranged on an interior surface of a windshield of a vehicle;
- a substantially transparent additional window being fixedly held onto the mounting ring at a predetermined distance from the interior surface of the windshield, thereby forming an air layer;
- an objective lens of a camera being positioned at a predetermined distance behind the additional window; and
- a cover substantially enclosing an area formed between the objective lens and the additional window.

* * * * *